(12) United States Patent
Sekiya (10) Patent No.: US 10,782,530 B2
(45) Date of Patent: Sep. 22, 2020

(54) INFORMATION TRANSFER MECHANISM FOR PROCESSING APPARATUS FOR DISPLAYING NOTICE INFORMATION TO AN OPERATOR

(71) Applicant: DISCO CORPORATION, Tokyo (JP)

(72) Inventor: Kazuma Sekiya, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 16/048,629

(22) Filed: Jul. 30, 2018

(65) Prior Publication Data
US 2019/0041647 A1 Feb. 7, 2019

(30) Foreign Application Priority Data
Aug. 4, 2017 (JP) .................................. 2017-151937

(51) Int. Cl.
*G02B 27/01* (2006.01)
*G05B 19/042* (2006.01)

(52) U.S. Cl.
CPC ....... *G02B 27/0172* (2013.01); *G02B 27/017* (2013.01); *G05B 19/042* (2013.01); *G02B 27/0179* (2013.01); *G02B 2027/014* (2013.01); *G02B 2027/0138* (2013.01); *G02B 2027/0141* (2013.01); *G02B 2027/0187* (2013.01); *G05B 2219/21063* (2013.01); *G05B 2219/23148* (2013.01)

(58) Field of Classification Search
CPC .............. G02B 2027/0141; G05B 2219/23148
See application file for complete search history.

(56) References Cited

U.S. PATENT DOCUMENTS

| 2006/0132382 | A1* | 6/2006 | Jannard ................ | G02B 27/017 345/8 |
| 2011/0115816 | A1* | 5/2011 | Brackney ............... | G06Q 10/06 345/629 |
| 2011/0249122 | A1* | 10/2011 | Tricoukes ............ | G02B 27/017 348/158 |
| 2011/0279666 | A1* | 11/2011 | Strombom ......... | G06K 9/00604 348/78 |
| 2012/0254792 | A1* | 10/2012 | Husoy ................... | G06F 3/0481 715/782 |
| 2015/0088546 | A1* | 3/2015 | Balram ................... | G06F 21/32 705/3 |
| 2015/0379770 | A1* | 12/2015 | Haley, Jr. ........... | G02B 27/0172 345/633 |

(Continued)

FOREIGN PATENT DOCUMENTS

| JP | 2010164814 A | 7/2010 |
| JP | 2015160696 A | 9/2015 |

*Primary Examiner* — Terrell M Robinson
(74) *Attorney, Agent, or Firm* — Greer Burns & Crain Ltd.

(57) ABSTRACT

An information transfer mechanism includes processing apparatus and a head-mounted display, and transfers information of the processing apparatus to an operator. The processing apparatus has an information transmitter for transmitting positional information of the processing apparatus, individual identification information of the processing apparatus, and notice information to be notified to the operator. The head-mounted display receives the notice information of the processing apparatus which have entered a visual field thereof and displays the received notice information in overlapping relation to the scene of peripheral processing apparatus.

2 Claims, 9 Drawing Sheets

(56) References Cited

U.S. PATENT DOCUMENTS

| | | | |
|---|---|---|---|
| 2016/0253563 A1* | 9/2016 | Lam | H04L 63/08 |
| | | | 348/130 |
| 2017/0039423 A1* | 2/2017 | Cork | G06K 9/00671 |
| 2017/0248272 A1* | 8/2017 | Ullrich | G06Q 10/10 |
| 2018/0225509 A1* | 8/2018 | Schmidt | G05B 19/0426 |
| 2018/0307045 A1* | 10/2018 | Nishi | G02B 27/0172 |
| 2019/0026930 A1* | 1/2019 | Kritzler | G06T 11/60 |

\* cited by examiner

INFORMATION TRANSFER MECHANISM FOR PROCESSING APPARATUS FOR DISPLAYING NOTICE INFORMATION TO AN OPERATOR

BACKGROUND OF THE INVENTION

Field of the Invention

The present invention relates to an information transfer mechanism for processing apparatus.

Description of the Related Art

There is known a head-mounted display, used in factories, for displaying a guidance image for guiding the operator to a storage position where an object to be picked is stored, based on a captured image of a storage apparatus (see, for example, Japanese Patent Laid-Open No. 2015-160696). There is also known a head-mounted display, used in factories, for displaying manual information related to work depending on the position of a hand of the operator (see, for example, Japanese Patent Laid-Open No. 2010-164814).

SUMMARY OF THE INVENTION

There are known processing apparatus in which any of various plate-shaped workpieces such as semiconductor wafers and packaged substrates is held on a chuck table and processed from its exposed face side. These processing apparatus include a dicing apparatus, a grinding apparatus, a laser processing apparatus, and so on. The processing apparatus are often installed in arrays in factories and operated and managed by a few operators. The operators operate the processing apparatus based on notice information (an indication by way of a warning sound or a warning light) generated by the processing apparatus.

Providing a plurality of processing apparatus that generate a common warning sound are installed in a factory, when the warning sound is being generated by one of the processing apparatus, an operator finds it difficult to quickly confirm which processing apparatus is generating the warning sound. Furthermore, when a warning sound regarding an emergency situation and a notice sound regarding a situation as much as an announcement are being simultaneously generated by different processing apparatus, individually, an operator also finds it difficult to instinctively determine which processing apparatus is generating the warning sound and which processing apparatus is generating the notice sound even if securing a certain distance to see the group processing apparatus. Consequently, the operator may delay dealing with the emergency situation.

It has been desired to minimize the above problems in the factories where a plurality of processing apparatus are installed. The head-mounted display disclosed in Japanese Patent Laid-Open No. 2015-160696 or Japanese Patent Laid-Open No. 2010-164814 fails to minimize the above problems in the factories where a plurality of processing apparatus are installed.

It is therefore an object of the present invention to provide an information transfer mechanism, for use in a factory where a plurality of processing apparatus are installed, which is able to minimize the problem of failing to determine a processing apparatus which is generating notice information.

In accordance with an aspect of the present invention, there is provided an information transfer mechanism for transferring information of processing apparatus to an operator, including processing apparatus having an information transmitter for transmitting positional information of the processing apparatus, individual identification information of the processing apparatus, and notice information to be notified to the operator, and a head-mounted display receiving the notice information of the processing apparatus which have entered a visual field thereof and displaying the received notice information in overlapping relation to the scene of peripheral processing apparatus.

The information transfer mechanism for processing apparatus according to the present invention is advantageous in that it can minimize the problem that the operator cannot tell processing apparatus that are transmitting notice information in a factory where a plurality of processing apparatus are installed.

The above and other objects, features and advantages of the present invention and the manner of realizing them will become more apparent, and the invention itself will best be understood from a study of the following description and appended claim with reference to the attached drawings showing some preferred embodiments of the invention.

DETAILED DESCRIPTION OF THE PREFERRED EMBODIMENTS

Preferred embodiments of the present invention will be described in detail below with reference to the drawings. The present invention is not limited to the details of the preferred embodiments described below. The components described below cover those which could easily be envisaged by those skilled in the art and those which are essentially identical to those described below. Furthermore, the arrangements described below can be used in appropriate combinations. Various omissions, replacements, or changes of the arrangements may be made without departing from the scope of the present invention.

Embodiment 1

Figure 1:
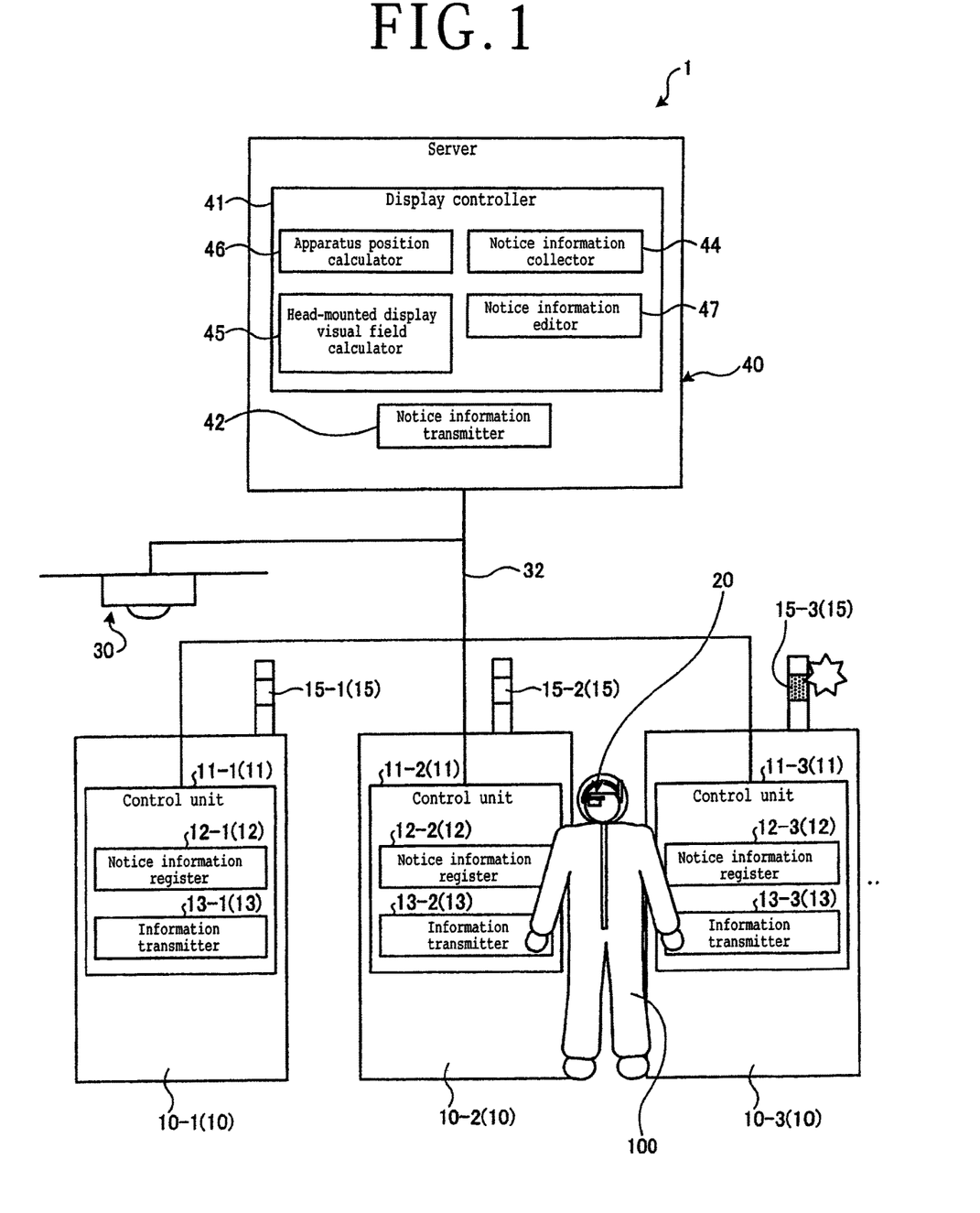
FIG. 1 is a diagram depicting a configurational example of an information transfer mechanism for processing apparatus according to Embodiment 1.
Figure 2:
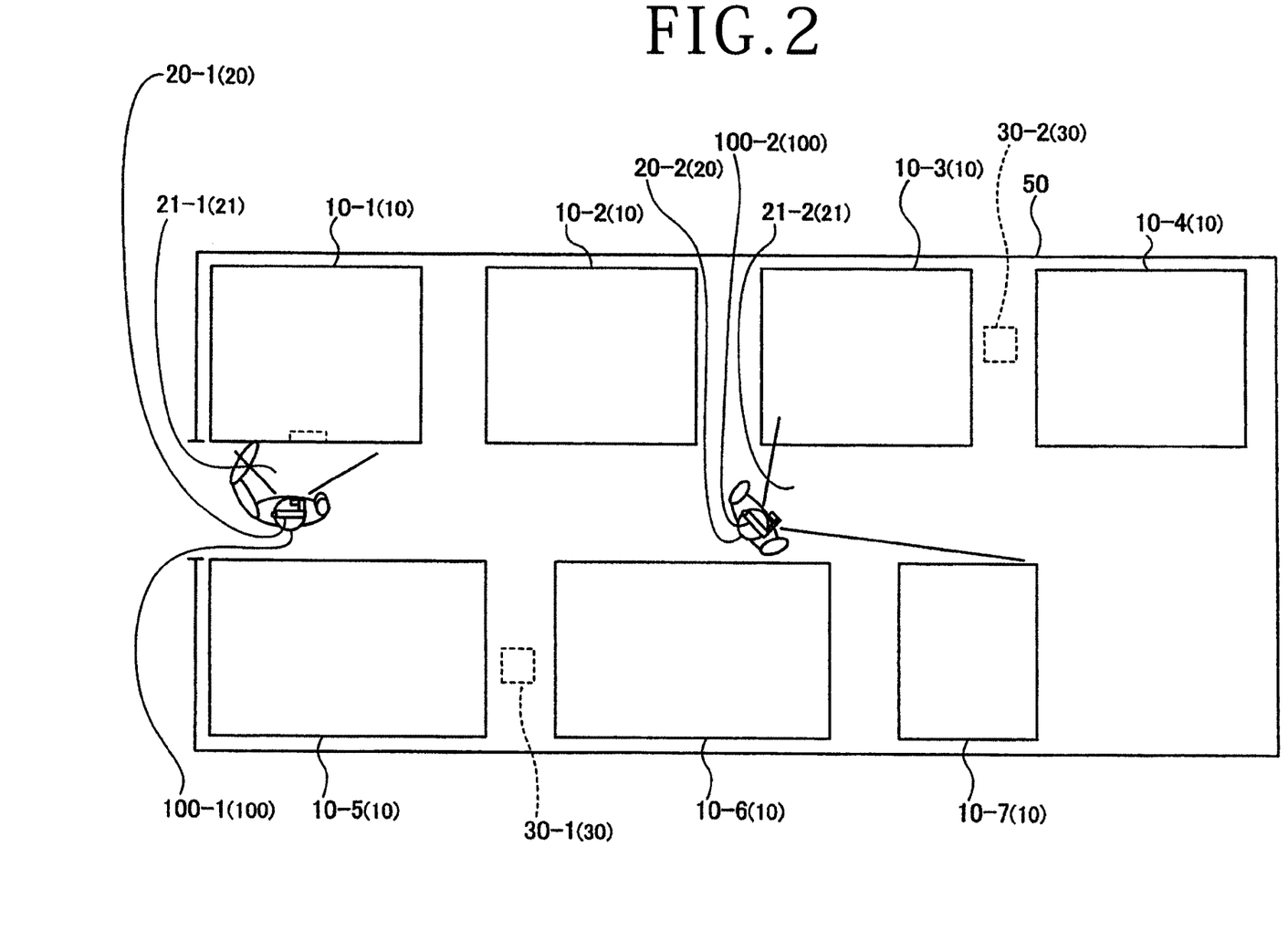
FIG. 2 is a plan view depicting a configurational example of the inside of a compartment in a factory where the information transfer mechanism for processing apparatus depicted in FIG. 1 is employed.

An information transfer mechanism 1 for processing apparatus according to Embodiment 1 of the present invention will be described below with reference to the drawings. FIG. 1 is a diagram depicting a configurational example of the information transfer mechanism 1 for processing apparatus according to Embodiment 1, and FIG. 2 is a plan view depicting a configurational example of the inside of a compartment in a factory where the information transfer mechanism 1 for processing apparatus depicted in FIG. 1 is employed. The information transfer mechanism 1 for processing apparatus is a mechanism or system for transferring information of processing apparatus 10-1, 10-2, 10-3, . . . to an operator 100. As depicted in FIG. 1, the information transfer mechanism 1 for processing apparatus has a plurality of processing apparatus 10-1, 10-2, 10-3, a head-mounted display 20, a head-mounted display detecting mechanism 30, and a server 40. In case the processing apparatus 10-1, 10-2, 10-3, . . . do not need to be distinguished from each other hereinbelow, they are referred to simply as processing apparatus 10. In case the components of the processing apparatus 10-1, 10-2, 10-3, . . . need to be distinguished from each other, the reference numerals of the components are followed by suffixes "-1," "-2," "-3," . . . , and in case they do not need to be distinguished from each other, those suffixes are omitted. The processing apparatus 10 may be a dicing apparatus, a grinding apparatus, a laser processing apparatus, and so on, for example, though the present invention is not limited to those processing apparatus but applicable to various processing apparatus.

As depicted in FIG. 2, the processing apparatus 10-1, 10-2, 10-3, 10-4, 10-5, 10-6, and 10-7 are installed in a compartment 50 of a factory. The compartment 50 houses the seven processing apparatus 10 installed therein. However, the present invention is not limited to those processing apparatus 10, and insofar as two or more processing apparatus 10 are provided, they may be arranged in any layouts.

Figure 3:
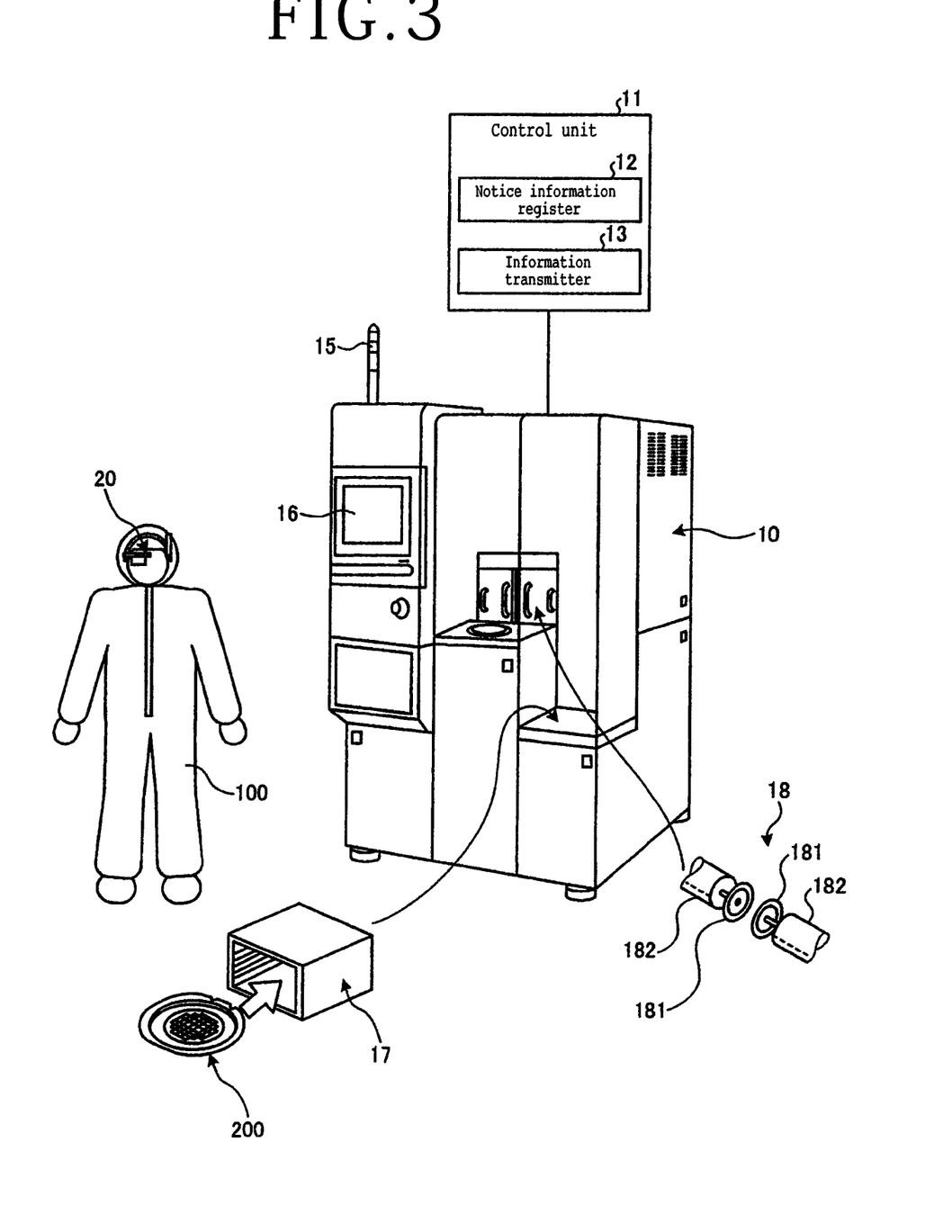
FIG. 3 is a perspective view depicting by way of example a processing apparatus included in the information transfer mechanism for processing apparatus depicted in FIG. 1.

The processing apparatus 10 will be described below with reference to the drawings. FIG. 3 is a perspective view depicting by way of example a processing apparatus included in the information transfer mechanism for processing apparatus depicted in FIG. 1. The processing apparatus 10 are apparatus for performing various processing operations on various workpieces, not depicted. As depicted in FIGS. 1 and 3, each of the processing apparatus 10 has a control unit 11, an indicator 15, and a display unit 16. The control units 11 of the respective processing apparatus 10 are connected to each other and the server 40 for information communication therebetween through a wired link via a data bus 32 capable of bidirectional communication. The present invention is not limited to a configuration where the control units 11 and the server 40 are connected through a wired link exemplified by the data bus 32 for information communication therebetween, but the control units 11 and the server 40 may be connected wirelessly for information communication.

The control unit 11 controls components of the processing apparatus 10 to enable the processing apparatus 10 to process a workpiece. The control unit 11 includes a computer. The control unit 11 has an arithmetic processing apparatus having a microprocessor such as a central processing unit (CPU), a storage apparatus having a memory such as a read only memory (ROM) or a random access memory (RAM), and an input/output interface apparatus. The arithmetic processing apparatus of the control unit 11 performs arithmetic processing operations according to computer programs stored in the storage apparatus, and outputs control signals for controlling the processing apparatus 10 through the input/output interface apparatus to the components of the processing apparatus 10. The control unit 11 is connected to the display unit 16 such as a liquid crystal display apparatus for displaying states of processing operations and images, and also to an input apparatus that is used for the operator to register processing detail information. The display unit 16 includes a liquid crystal display apparatus or the like and displays states of processing operations and images under the control of the control unit 11. The input apparatus includes at least one of a touch panel provided on the display unit 16, a keyboard, etc.

The control unit 11 has a notice information register 12 and an information transmitter 13. The function of the notice information register 12 is performed when the storage apparatus of the control unit 11 stores information that is input. The notice information register 12 accepts, from the input apparatus or the like for registration, positional information of the processing apparatus 10, individual identification information of the processing apparatus 10, information to be notified to the operator 100 by each of the processing apparatus 10 (hereinafter referred to as notice information), and degrees of importance of each notice information.

According to Embodiment 1, the positional information of the processing apparatus 10 represents the position of each of the processing apparatus 10 in the factory. However, the positional information of the processing apparatus 10 may represent a global position. The individual identification information of the processing apparatus 10 refers to information for identifying the processing apparatus 10 each other. According to Embodiment 1, the individual identification information represents a string of numerals or characters assigned to each of the processing apparatus 10.

According to Embodiment 1, the notice information representing the greatest degree of importance refers to information indicating trouble of the processing apparatus 10 itself, such as component damage of each processing apparatus 10, a workpiece transport error in each processing apparatus 10, etc., for example. If the processing apparatus 10 is a dicing apparatus, then the notice information representing the greatest degree of importance refers to, in addition to a workpiece transport error, cutting blade damage, a spindle load overcurrent, a kerf check error, etc.

According to Embodiment 1, the notice information representing the medium degree of importance refers to information indicating that the components of each processing apparatus 10 have reached a replacement time, the processing operation of each processing apparatus 10 has ended, etc. If the processing apparatus 10 is a dicing apparatus, then the notice information representing the medium degree of importance refers to information indicating that the cutting blade has reached a replacement time and information prompting the operator to replace the workpiece or a cassette containing a plurality of workpieces when the processing operation has ended.

According to Embodiment 1, the notice information representing the least degree of importance refers to information indicating the processing status of each processing apparatus 10. If the processing apparatus 10 is a dicing apparatus for cutting a plurality of workpieces, then the notice information representing the least degree of importance refers to the number of a workpiece being processed at present, a predicted expiration date of the cutting blade now in use, etc.

The positional information of the processing apparatus 10, the individual identification information of the processing apparatus 10, each notice information, and the degrees of importance of each notice information, as described above, are entered from the input apparatus and registered in the notice information register 12. The notice information register 12 accepts, for registration, notice information to be indicated to the operator 100 with respect to processing apparatus 10 in relation to degrees of importance. The degrees of importance for notice information are predetermined for respective properties of various types of notice information depending on emergency levels that need to be dealt with by the operator 100.

The function of the information transmitter 13 is performed when the input/output interface apparatus of the control unit 11 carries out a process of transmitting information stored in the storage apparatus to the server 40. The information transmitter 13 transmits various items of information accepted for registration by the notice information register 12 out of the processing apparatus 10 by transmitting them via the data bus 32 to the server 40.

According to Embodiment 1, the information transmitter 13 transmits positional information of the processing apparatus 10 and individual identification information of the processing apparatus 10 at each of given timings. Given timings, for example, refer to timings at which the information transfer mechanism 1 of the processing apparatus is started up, or timings that are spaced by relatively long time intervals such as timings at constant times or daily timings. According to Embodiment 1, when the processing apparatus 10 is in a situation indicated by notice information registered in the notice information register 12, the information transmitter 13 immediately transmits the corresponding notice information and the degree of importance of the notice information. When the situation indicated by the notice information disappears, the information transmitter 13 immediately transmits notice information indicating that the situation has disappeared.

The control unit 11 determines whether or not the processing apparatus 10 is in a situation indicated by notice information registered in the notice information register 12. If the control unit 11 determines that the processing apparatus 10 is in a situation indicated by notice information registered in the notice information register 12 and the degree of importance of the notice information corresponding to the situation is higher than a preset degree of importance, then the control unit 11 outputs a control signal for giving an indication to the indicator 15. In response to the control signal for giving an indication from the control unit 11, the indicator 15 gives an indication. The indicator 15 may be a sound indicator for giving an indication by way of a warning sound, a light indicator for giving an indication by way of a warning light, or a sound/light indicator for giving an indication by way of a warning sound and a warning light, for example. According to Embodiment 1, when the control unit 11 determines that the processing apparatus 10 is in a situation indicated by the notice information representing the maximum degree of importance among the notice information registered in the notice information register 12, the controller unit 11 controls the indicator 15 to give an indication.

The processing apparatus 10 that is illustrated in FIG. 3 is a dicing apparatus. The dicing apparatus 10 depicted in FIG. 3 has a cassette 17 for housing a workpiece 200 therein and a processing section 18. The processing section 18 has a cutting blade 181 for cutting the workpiece 200 removed from the cassette 17 and a spindle 182 on which the cutting blade 181 is rotatably mounted. The processing section 18 differs from processing apparatus 10 to processing apparatus 10. If the processing apparatus 10 is a grinding apparatus, for example, then it has a grinding mechanism, and if the processing apparatus 10 is a laser processing apparatus, for example, then it has a laser processing mechanism.

Figure 4:
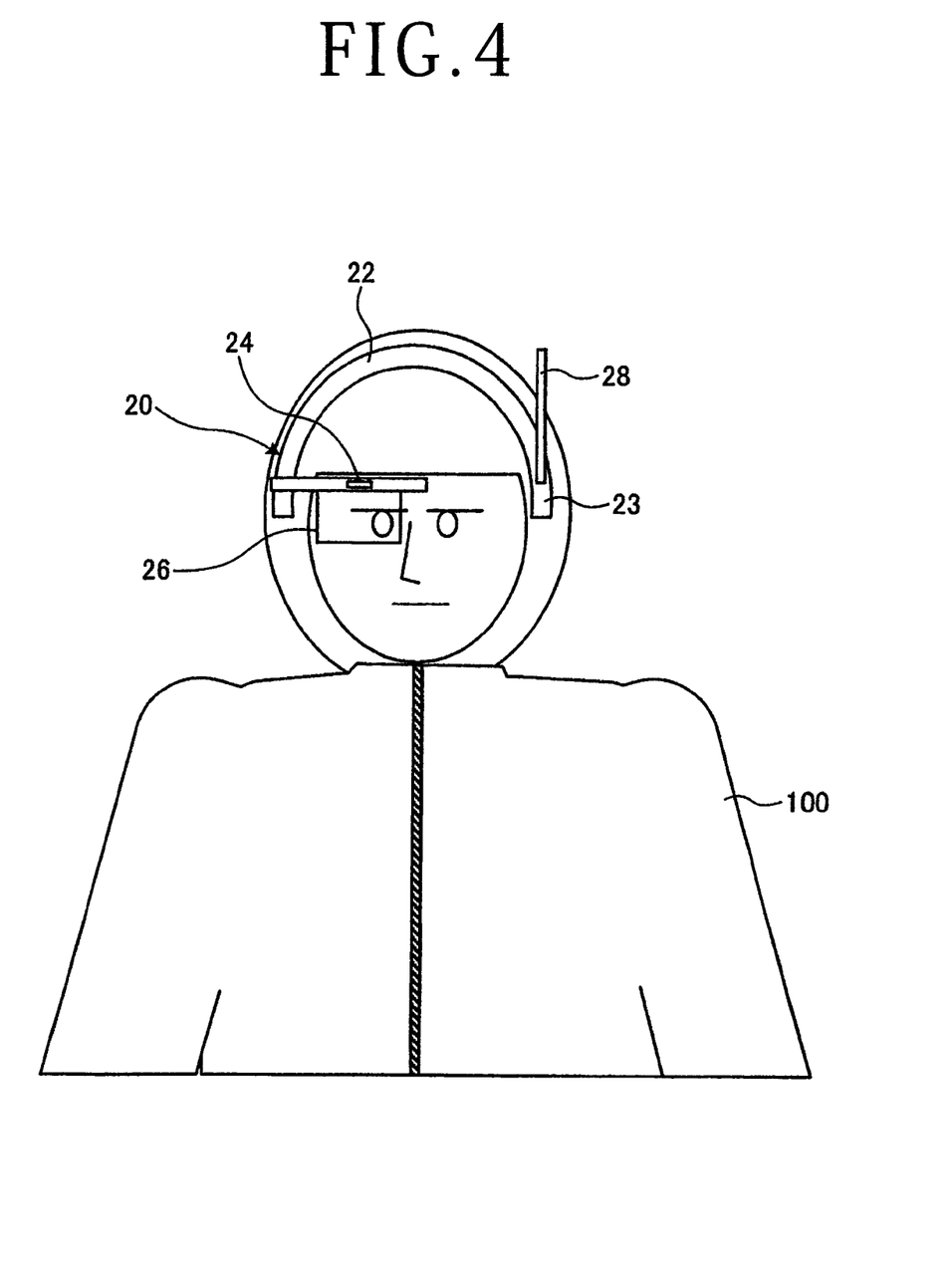
FIG. 4 is a front elevational view depicting a head-mounted display included in the information transfer mechanism for processing apparatus depicted in FIG. 1.

The head-mounted display 20 will be described below with reference to the drawings. FIG. 4 is a front elevational view depicting the head-mounted display 20 included in the information transfer mechanism 1 for processing apparatus depicted in FIG. 1. As depicted in FIG. 4, the head-mounted display 20 includes a mount 22, a power supply switch 23, a sensor 24, a screen 26, and communication means 28.

The head-mounted display 20 is not connected by a wired link typified by a data bus to the processing apparatus 10, the head-mounted display detecting mechanism 30, and the server 40 which are other components of the information transfer mechanism 1. Therefore, the head-mounted display 20 is portable equipment that can independently be changed in position with respect to the processing apparatus 10, the head-mounted display detecting mechanism 30, and the server 40.

The mount 22 is a plate-like member curved in an arcuate shape whose diameter is approximately the same as the diameter of a standard adult's head, and will be mounted on the head of the operator 100. The mount 22 has its specifications variable by the operator 100 depending on the shape and size of the head of the operator 100.

The power supply switch 23 is disposed on an outer peripheral side of one of the ends of the mount 22, and selectively turns on and off the power supply of the head-mounted display 20. When the power supply switch 23 turns on the power supply of the head-mounted display 20, the sensor 24, the screen 26, and the communication means 28 are energized to performing their functions. When the power supply switch 23 turns off the power supply of the head-mounted display 20, the sensor 24, the screen 26, and the communication means 28 are de-energized to stop performing their functions.

The sensor 24 is fixedly disposed on the screen 26, to be described below, near an end thereof by the mount 22. The sensor 24 acquires line-of-sight information which represents information in the direction of the line of sight of the head-mounted display 20. The sensor 24 may be an acceleration sensor, a gyro sensor, a geomagnetic sensor, or the like that functions as a three-dimensional angle sensor. The sensor 24 acquires line-of-sight information of the head-mounted display 20 by acquiring tilt information of the head-mounted display 20 near the screen 26. The sensor 24 is connected to the communication means 28 through a wired link for information communication therebetween. The sensor 24 sends line-of-sight information of the head-mounted display 20 to the server 40 wirelessly via the communication means 28.

The screen 26 is a display that is transparent or semi-transparent to visible light. The screen 26 is mounted on a member extending from one of the ends of the mount 22. When the head-mounted display 20 is worn by the operator 100, the screen 26 is disposed along a direction perpendicular to the direction of the line of sight of the operator 100 in covering relation to one of the eyes of the operator 100 at a position facing the eye of the operator 100 in the direction of the line of sight of the operator 100.

The screen 26 has its size determining a visual field 21 (see FIG. 7) of the head-mounted display 20. The screen 26 transmits therethrough the scene of peripheral processing apparatus 10 in the visual field 21. The screen 26 is connected to the communication means 28 through a wired link for information communication therebetween. The screen 26 receives notice information of the processing apparatus 10 that have entered the visual field 21 of the head-mounted display 20 from the server 40 through the communication means 28. The screen 26 displays the notice information of the processing apparatus 10 that have entered the visual field 21 of the head-mounted display 20, which has been received from the server 40. The operator 100 is now able to see in an overlapping manner the scene of peripheral processing apparatus 10 in the visual field 21 that is transmitted through the screen 26 and the notice information of the processing apparatus 10 that have entered the visual field 21 of the head-mounted display 20, which has been received from the server 40 and displayed on the screen 26, by directing the line of sight to the screen 26.

The communication means 28 has the data bus through which it is connected to the sensor 24 and the screen 26 via the wired links for information communication therebetween, a transceiver connected to the server 40 wirelessly for information communication therebetween, and a transmitter for transmitting a medium. The communication means 28 transmits the line-of-sight information of the head-mounted display 20 that has been received by the sensor 24 to the server 40. The communication means 28 receives the notice information of the processing apparatus 10 that have entered the visual field 21 of the head-mounted display 20 from the server 40, and transmits the received notice information to the screen 26.

The communication means 28 transmits a medium from the transmitter. The medium transmitted from the communication means 28 may be an infrared radiation, a far-infrared radiation, and radio waves used by a wireless communication technology such as Bluetooth (registered trademark), wireless fidelity (WiFi) (registered trademark), or the like. When the medium transmitted by the communication means 28 is detected by the head-mounted display detecting mechanism 30, positional information that represents information related to the position of the head-mounted display 20 in the compartment 50 is acquired by the head-mounted display detecting mechanism 30.

A head-mounted display 20-1 depicted in FIG. 2 is used by an operator 100-1 in the compartment 50. A head-mounted display 20-2 depicted in FIG. 2 is used by an operator 100-2 in the compartment 50. In this manner, a plurality of head-mounted displays 20-1 and 20-2 are used by a plurality of operators 100-1 and 100-2 in the common compartment 50. In case the head-mounted displays 20-1 and 20-2 do not need to be distinguished from each other hereinbelow, they are referred to simply as head-mounted displays or display 20. In case the operators 100-1 and 100-2 do not need to be distinguished from each other hereinbelow, they are referred to simply as operators or operator 100. Although the two head-mounted displays 20 are used by the two operators 100 in the compartment 50, the present invention is not limited to such a configuration, but one head-mounted display 20 may be used by one operator 100 or three or more head-mounted displays 20 may be used by three or more operators 100.

As depicted in FIG. 2, the head-mount display 20-1 has a visual field 21-1 including part of the processing apparatus 10-1. Therefore, the operator 100-1 captures in its vision part of the processing apparatus 10-1 in the visual field 21-1 through the head-mounted display 20-1. As depicted in FIG. 2, the head-mount display 20-2 has a visual field 21-2 including part of the processing apparatus 10-3 and part of the processing apparatus 10-4. Therefore, the operator 100-2 captures in its vision the processing apparatus 10-3 and the processing apparatus 10-4 in the visual field 21-2 through the head-mounted display 20-2. In case the visual fields 21-1 and 21-2 do not need to be distinguished from each other hereinbelow, they are referred to simply as visual fields or field 21. The visual field 21 is the same as a visual field calculated by a head-mounted display visual field calculator 45 of a display controller 41 to be described later.

The head-mounted display detecting mechanism 30 detects a medium transmitted by the communication means 28 of the head-mounted display 20. The head-mounted display detecting mechanism 30 acquires information related to the direction and distance of the communication means 28 that has transmitted the medium by detecting the medium transmitted by the communication means 28. In this manner, the head-mounted display detecting mechanism 30 acquires positional information of the individual head-mounted displays 20 by individually detecting the head-mounted displays 20.

As depicted in FIG. 1, the head-mounted display detecting mechanism 30 is connected to the server 40 for information communication therebetween through the wired link via the data bus 32. The head-mounted display detecting mechanism 30 transmits positional information of the head-mounted display 20 to the server 40 via the data bus 32. The present invention is not limited to a configuration in which the head-mounted display detecting mechanism 30 is connected to the server 40 for information communication therebetween through the wired link via the data bus 32, but the head-mounted display detecting mechanism 30 may be connected wirelessly to the server 40 for information communication therebetween.

A head-mounted display detecting mechanism 30-1 depicted in FIG. 2 is installed in a gap, as viewed in plan, between the processing apparatus 10-5 and the processing apparatus 10-6 in the compartment 50. A head-mounted display detecting mechanism 30-2 depicted in FIG. 2 is installed in a gap, as viewed in plan, between the processing apparatus 10-3 and the processing apparatus 10-4 in the compartment 50. In this manner, a plurality of head-mounted display detecting mechanisms 30-1 and 30-2 are installed and used in the common compartment 50. In case the head-mounted display detecting mechanisms 30-1 and 30-2 do not need to be distinguished from each other hereinbelow, they are referred to simply as head-mounted display detecting mechanisms or mechanism 30. Although the two head-mounted display detecting mechanisms 30-1 and 30-2 are used in the compartment 50, the present invention is not limited to such a configuration, but one head-mounted display detecting mechanism 30 may be used or three or more head-mounted display detecting mechanisms 30 may be used. It is preferable to use a plurality of head-mounted display detecting mechanisms 30 in the compartment 50 for increased positional accuracy of the head-mounted displays 20.

The server 40 includes a computer. The server 40 has an arithmetic processing apparatus having a microprocessor such as a CPU, a storage apparatus having a memory such as a ROM or a RAM, and an input/output interface apparatus. The arithmetic processing apparatus of the server 40 performs arithmetic processing operations according to computer programs stored in the storage apparatus, and outputs control signals for controlling operation of the information transfer mechanism 1 for the processing apparatus through the input/output interface apparatus to the components of the information transfer mechanism 1 for the processing apparatus. The server 40 is connected to the respective control units 11 of the processing apparatus 10 and the head-mounted display detecting mechanisms 30 through wired links via the data bus 32 for information communication therebetween. The server 40 is also connected to the head-mounted displays 20 wirelessly via a transceiver in the server 40 for information communication therebetween.

As depicted in FIG. 1, the server 40 includes a display controller 41 and a notice information transmitter 42. The display controller 41 has a notice information collector 44, a head-mounted display visual field calculator 45, an apparatus position calculator 46, and a notice information editor 47. The function of the display controller 41 and the respective functions of the notice information collector 44, the head-mounted display visual field calculator 45, the apparatus position calculator 46, and the notice information editor 47 of the display controller 41 are performed when the arithmetic processing apparatus of the server 40 executes computer programs stored in the storage apparatus thereof.

The display controller 41 controls the head-mounted display 20 to display notice information of the processing apparatus 10 in the visual field 21 (see FIG. 2 and to be described later) of the head-mounted display 20 in overlapping relation to the scene of the peripheral processing apparatus 10 on the head-mounted display 20.

The notice information collector 44 receives the positional information of the processing apparatus 10, the individual identification information of the processing apparatus 10, the notice information of the processing apparatus 10, and the information of the degrees of importance of the notice information from the respective control units 11 of the processing apparatus 10, and collects the received information in relation to each other. When the notice information collector 44 receives notice information indicating that the situations indicated by the notice information from the control units 11 have disappeared, the notice information collector 44 deletes the notice information indicating that the situations have disappeared and the information of the degrees of importance related to that notice information.

The head-mounted display visual field calculator 45 calculates the visual field 21 of the head-mounted display 20 based on the positional information of the head-mounted display 20 which the head-mounted display detecting mechanism 30 has received from the head-mounted display 20 and the line-of-sight information of the head-mounted display 20.

The apparatus position calculator 46 extracts the processing apparatus 10 that have entered the visual field 21 of the head-mounted display 20 and calculates the positions of the extracted processing apparatus 10 in the visual field 21 based on the positional information and the individual identification information of the head-mounted display 20 that have been collected by the notice information collector 44 and the information of the visual field 21 of the head-mounted display 20 that has been calculated by the head-mounted display visual field calculator 45.

The notice information editor 47 determines whether or not there is notice information related to the processing apparatus 10 that have entered the visual field 21 of the head-mounted display 20 that have been extracted by the apparatus position calculator 46, from the information collected by the notice information collector 44. If the notice information editor 47 determines that there is such notice information, the notice information editor 47 extracts the notice information related to the processing apparatus 10 that have entered the visual field 21 of the head-mounted display 20 that have been extracted by the apparatus position calculator 46, from the information collected by the notice information collector 44. The notice information editor 47 edits the extracted notice information so that it will be displayed on the head-mounted display 20 at the positions calculated by the apparatus position calculator 46 in the visual field 21, of the processing apparatus 10 extracted by the apparatus position calculator 46. In this manner, the notice information editor 47 acquires the notice information of the processing apparatus 10 that have entered the visual field 21 of the head-mounted display 20, which notice information has been controlled so as to be displayed in overlapping relation to the scene of the peripheral processing apparatus 10 on the head-mounted display 20.

The notice information editor 47 can change a display method for display on the head-mounted display 20 depending on the information of the degree of importance of notice information. Specifically, the notice information editor 47 can change at least either one of a font size, a font color, and a font type to be displayed on the head-mounted display 20 depending on the information of the degree of importance of notice information. For example, as the degree of importance of notice information is higher, the notice information editor 47 may display a larger font, or a more striking font color that gives the operator 100 a sense of urgency, or a more striking font type that gives the operator 100 a sense of urgency.

The function of the notice information transmitter 42 is performed when the input/output interface apparatus of the server 40 carries out a process of sending the information stored in the storage apparatus to the head-mounted display 20. The notice information transmitter 42 sends the notice information edited by the notice information editor 47 and the information representing the positions of the notice information in the visual field 21 wirelessly to the head-mounted display 20. The notice information transmitter 42 sends the notice information of the processing apparatus 10 that have entered the visual field 21 of the head-mounted display 20, which notice information has been controlled so as to be displayed in overlapping relation to the scene of the peripheral processing apparatus 10 on the head-mounted display 20, acquired by the display controller 41, wirelessly to the head-mounted display 20.

Figure 5:
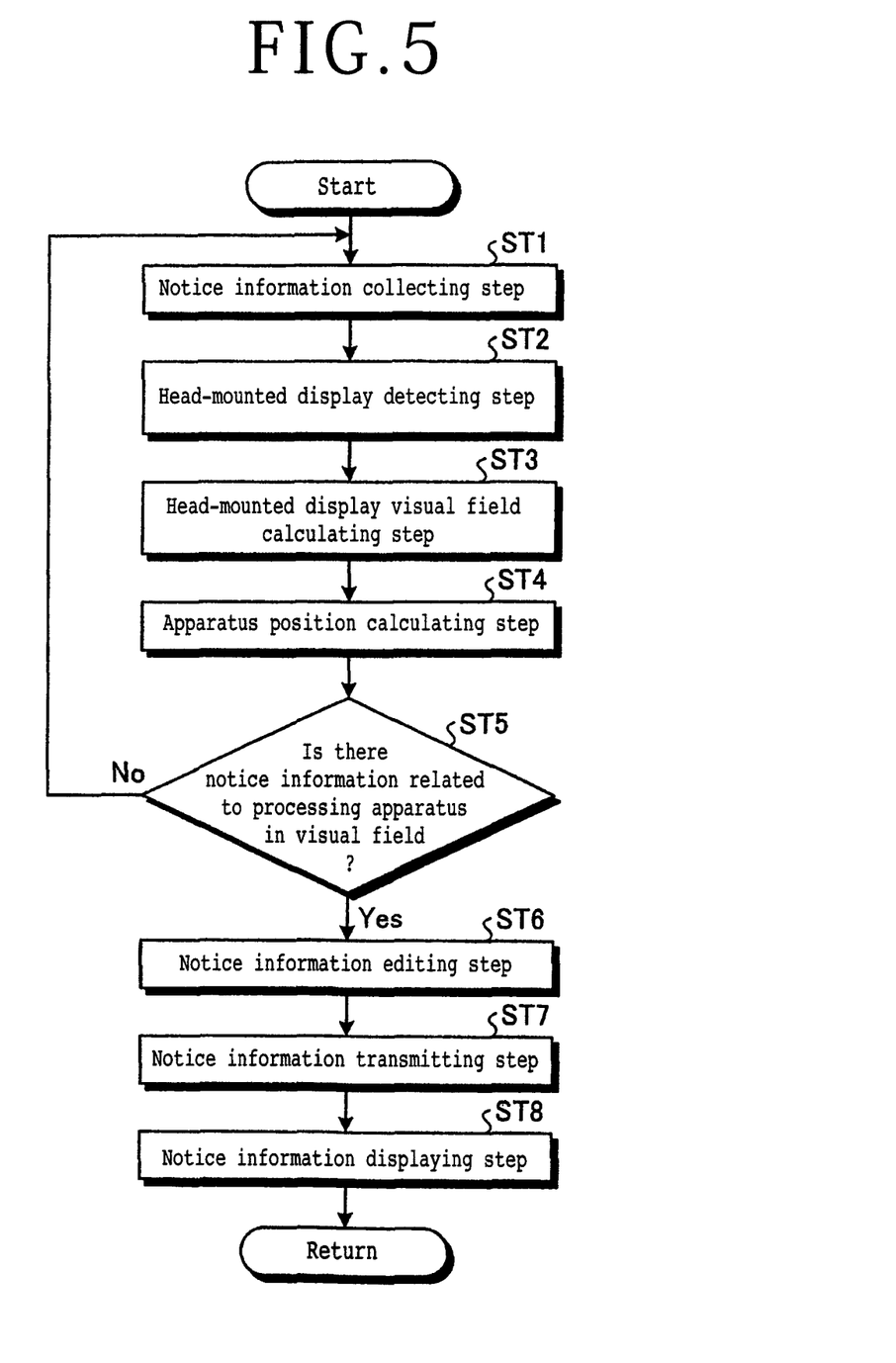
FIG. 5 is a flowchart of an information transfer method for processing apparatus, which represents an example of operation of the information transfer mechanism for processing apparatus depicted in FIG. 1.
Figure 6:
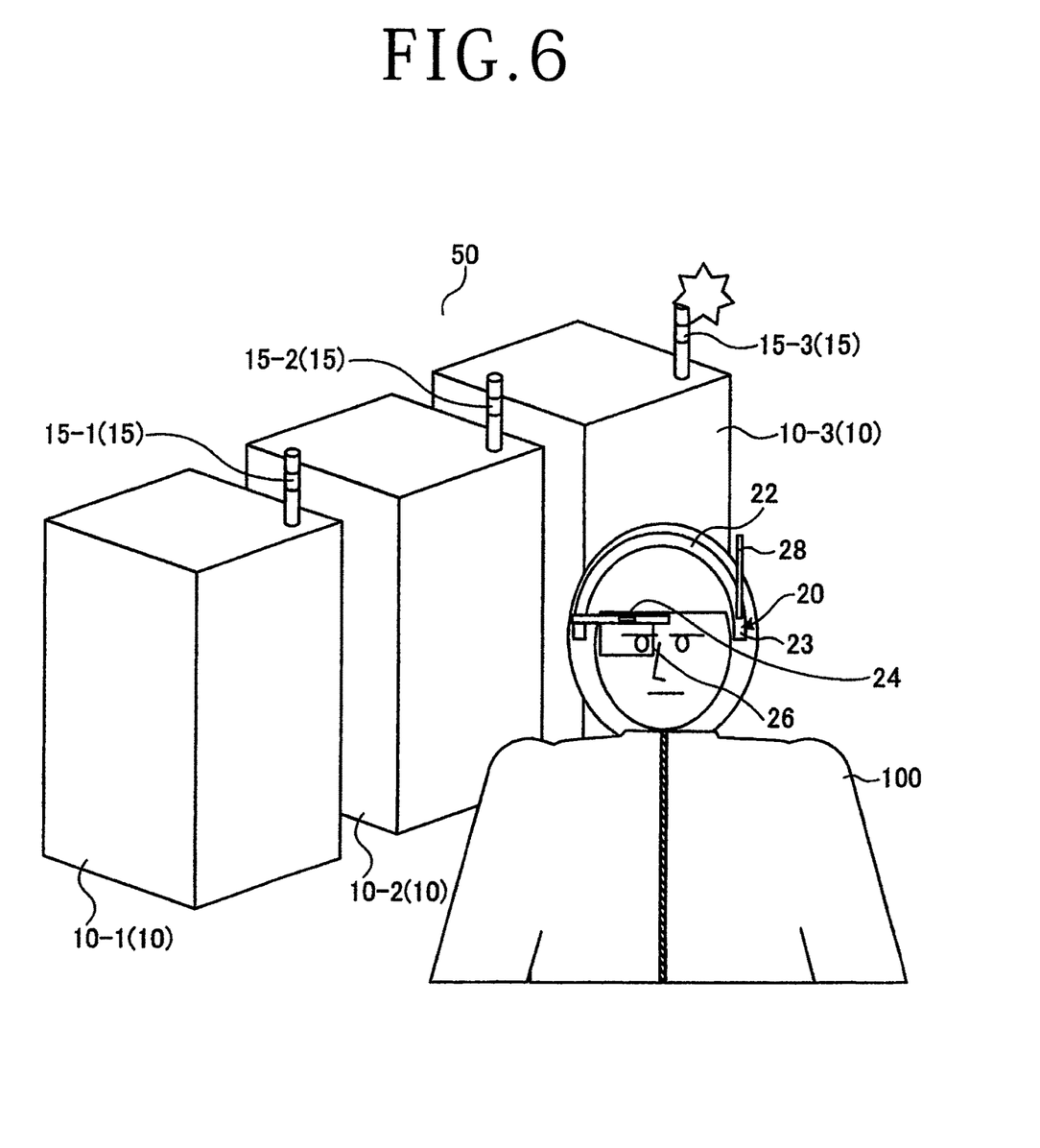
FIG. 6 is a perspective view depicting some components in a starting stage of the information transfer method for processing apparatus depicted in FIG. 5.
Figure 7:
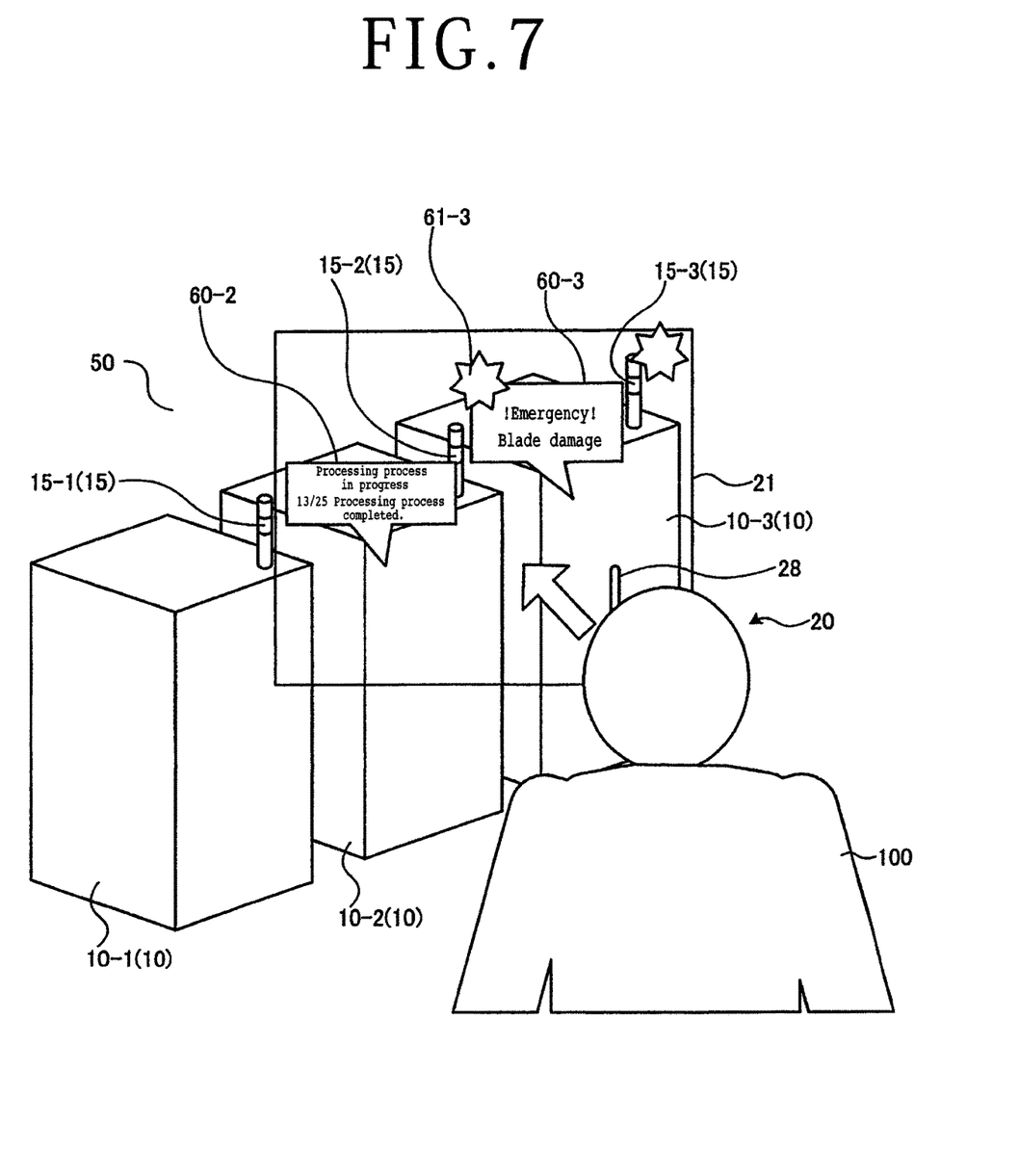
FIG. 7 is a perspective view depicting some components in an ending stage of the information transfer method for processing apparatus depicted in FIG. 5.

An information transfer method for processing apparatus, which represents an example of operation of the information transfer mechanism 1 for processing apparatus according to Embodiment 1, will be described below. FIG. 5 is a flowchart of an information transfer method for processing apparatus, which represents an example of operation of the information transfer mechanism for processing apparatus depicted in FIG. 1. FIG. 6 is a perspective view depicting some components in a starting stage of the information transfer method for processing apparatus depicted in FIG. 5. FIG. 7 is a perspective view depicting some components in an ending stage of the information transfer method for processing apparatus depicted in FIG. 5.

The information transfer method for processing apparatus refers to an information transfer method for the processing apparatus 10, using the information transfer mechanism 1 for processing apparatus according to Embodiment 1. As depicted in FIG. 5, the information transfer method includes notice information collecting step ST1, head-mounted display detecting step ST2, head-mounted display visual field calculating step ST3, apparatus position calculating step ST4, notice information presence/absence determining step ST5, notice information editing step ST6, notice information transmitting step ST7, and notice information displaying step ST8.

In response to a processing operation start command from the operator 100, each processing apparatus 10 processes a workpiece 200 housed in the cassette 17 by the operator 100 under the control of the control unit 11, based on processing detail information registered in the control unit 11 by the operator 100.

The information transfer method for processing apparatus is mainly carried out after each processing apparatus 10 has started its processing operation. The information transfer method for processing apparatus starts when, as depicted in FIG. 6, the operator 100 wears the head-mounted display 20 on its head and operates the power supply switch 23 to switch on the power supply of the head-mounted display 20 from its turn-off state in the compartment 50 of the factory where each processing apparatus 10 is installed.

Notice information collecting step ST1 is a step in which the notice information collector 44 receives and collects the positional information of each processing apparatus 10, the individual identification information of each processing apparatus 10, the notice information of each processing apparatus 10, and the information of the degrees of importance of each notice information from the control unit 11 of each processing apparatus 10. Notice information collecting step ST1 may be carried out in advance of the operator 100 wearing the head-mounted display 20 and switching on the power supply thereof. In addition, notice information collecting step ST1 does not need to be carried out before head-mounted display detecting step ST2 and head-mounted display visual field calculating step ST3 to be described later, insofar as it is carried out prior to apparatus position calculating step ST4 to be described later.

Head-mounted display detecting step ST2 is a step in which the head-mounted display detecting mechanism 30 detects the head-mounted display 20 by detecting a medium transmitted by the communication means 28 of the head-mounted display 20. The head-mounted display detecting mechanism 30 acquires information related to the direction and distance of the communication means 28 that has transmitted the medium by detecting the medium transmitted by the communication means 28. Then, the head-mounted display detecting mechanism 30 acquires positional information of the head-mounted display 20. The head-mounted display detecting mechanism 30 sends the acquired positional information of the head-mounted display 20 to the server 40. Head-mounted display detecting step ST2 is carried out after the operator 100 has worn the head-mounted display 20 and switched on the power supply thereof.

In head-mounted display visual field calculating step ST3, first, the sensor 24 acquires line-of-sight information of the head-mounted display 20 by acquiring tilt information of the head-mounted display 20. In head-mounted display visual field calculating step ST3, then, the head-mounted display 20 sends the acquired line-of-sight information of the head-mounted display 20 to the server 40. In head-mounted display visual field calculating step ST3, finally, the head-mounted display visual field calculator 45 calculates the visual field 21 of the head-mounted display 20 based on the positional information of the head-mounted display 20 which has been received from head-mounted display detecting mechanism 30 and the line-of-sight information of the head-mounted display 20 which has been received from the head-mounted display 20. Head-mounted display visual field calculating step ST3 is carried out after head-mounted display detecting step ST2.

Apparatus position calculating step ST4 is a step in which the apparatus position calculator 46 extracts the processing apparatus 10 that have entered the visual field 21 of the head-mounted display 20 and calculates the positions of the extracted processing apparatus 10 in the visual field 21 based on the positional information which has been collected by the notice information collector 44 and the information of the visual field 21 of the head-mounted display 20 that has been calculated by the head-mounted display visual field calculator 45. Apparatus position calculating step ST4 is carried out after notice information collecting step ST1 and after head-mounted display visual field calculating step ST3.

Notice information presence/absence determining step ST5 is a step in which the notice information editor 47 determines whether or not there is notice information related to the processing apparatus 10 that have entered the visual field 21 of the head-mounted display 20 that have been extracted by the apparatus position calculator 46, from the information collected by the notice information collector 44. Notice information presence/absence determining step ST5 is carried out after apparatus position calculating step ST4. If the notice information editor 47 determines that there is no notice information related to the processing apparatus 10 that have entered the visual field 21 of the head-mounted display 20 that have been extracted by the apparatus position calculator 46, from the information collected by the notice information collector 44 (notice information presence/absence determining step ST5: No), then control goes back to notice information collecting step ST1. If the notice information editor 47 determines that there is notice information related to the processing apparatus 10 that have entered the visual field 21 of the head-mounted display 20 that have been extracted by the apparatus position calculator 46, from the information collected by the notice information collector 44 (notice information presence/absence determining step ST5: Yes), then control goes to notice information editing step ST6.

In notice information editing step ST6, first, the notice information editor 47 extracts the notice information related to the processing apparatus 10 that have entered the visual field 21 of the head-mounted display 20 that have been extracted by the apparatus position calculator 46, from the information collected by the notice information collector 44. In notice information editing step ST6, then, the notice information editor 47 extracts the individual identification information of the processing apparatus 10 related to the extracted notice information related to the processing apparatus 10. Thereafter, the notice information editor 47 edits the extracted notice information so that it will be displayed on the head-mounted display 20 at the positions calculated by the apparatus position calculator 46 in the visual field 21, of the processing apparatus 10 extracted by the apparatus position calculator 46. Notice information editing step ST6 is thus a step in which the notice information editor 47 acquires the notice information of the processing apparatus 10 that have entered the visual field 21 of the head-mounted display 20, which notice information has been controlled so as to be displayed in overlapping relation to the scene of the peripheral processing apparatus 10 on the head-mounted display 20. Notice information editing step ST6 is carried out after notice information presence/absence determining step ST5 providing notice information presence/absence determining step ST5 has decided "Yes." In notice information editing step ST6, the notice information editor 47 can change a display method for display on the head-mounted display 20 depending on the information of the degree of importance of the notice information.

Notice information transmitting step ST7 is a step in which the notice information transmitter 42 sends the notice information edited in notice information editing step ST6 and the information representing the positions of the notice information in the visual field 21 wirelessly to the head-mounted display 20. In this manner, the notice information transmitter 42 sends the notice information of the processing apparatus 10 that have entered the visual field 21 of the head-mounted display 20, which notice information has been controlled so as to be displayed in overlapping relation to the scene of the peripheral processing apparatus 10 on the head-mounted display 20, wirelessly to the head-mounted display 20. Notice information transmitting step ST7 is carried out after notice information editing step ST6.

In notice information displaying step ST8, first, the screen 26 of the head-mounted display 20 receives notice information of the processing apparatus 10 that have entered the visual field 21 of the head-mounted display 20 from the server 40 through the communication means 28. Then, the screen 26 displays the notice information, received from the server 40, of the processing apparatus 10 that have entered the visual field 21 of the head-mounted display 20. Notice information displaying step ST8 is carried out after notice information transmitting step ST7. The operator 100 can thus see in an overlapping manner the scene of peripheral processing apparatus 10 in the visual field 21 that is transmitted through the screen 26 and the notice information of the processing apparatus 10 that have entered the visual field 21 of the head-mounted display 20, which has been received from the server 40 and displayed on the screen 26, by directing the line of sight to the screen 26.

After the information transfer method for processing apparatus, from notice information collecting step ST1 to notice information displaying step ST8, has been performed in one cycle, the screen 26 displays, as depicted in FIG. 7, the scene of peripheral processing apparatus 10-2 and 10-3 in the visual field 21 that is transmitted through the screen 26, notice information 60-2 of the processing apparatus 10-2 that has entered the visual field 21 of the head-mounted display 20 displayed on the screen 26, and notice information 60-3 of the processing apparatus 10-3 that has entered the visual field 21 of the head-mounted display 20 displayed on the screen 26 in an overlapping manner.

As depicted in FIG. 7, the notice information 60-2 refers to notice information including a message indicating that a processing process is in progress and a state indicating how the processing process is going on, and has a low degree of importance representing a lack of emergency not requiring the operator 100 to deal with the processing apparatus 10-2. As depicted in FIG. 7, the notice information 60-3 refers to notice information including a message indicating that an emergency situation has arisen and a state about apparatus trouble as a blade damage, and has a high degree of importance representing a level of emergency requiring the operator 100 to deal with the processing apparatus 10-3. Therefore, the screen 26 displays, as depicted in FIG. 7, the notice information 60-3 of the high degree of importance much strikingly in a large font with exclamation marks, for example, giving the operator 100 a sense of urgency, compared with the notice information 60-2 of the low degree of importance. In addition, the screen 26 displays, as depicted in FIG. 7, additional notice information 61-3 in addition to the notice information 60-3 of the high degree of importance in order to give the operator 100 a sense of urgency. For example, the screen 26 may display the notice information 60-3 of the high degree of importance in a red color giving the operator 100 a sense of urgency, and may display the notice information 60-2 of the low degree of importance in a blue color not giving the operator 100 a sense of urgency.

The information transfer method for processing apparatus depicted in FIG. 5 is repeatedly carried out while the power supply of the head-mounted display 20 is on after each processing apparatus 10 has started its processing operation. In other words, according to the information transfer method for processing apparatus depicted in FIG. 5, upon elapse of a predetermined time after notice information displaying step ST8 has been carried out, notice information collecting step ST1 is carried out again. According to the information transfer method for processing apparatus depicted in FIG. 5, if a situation represented by the notice information of a processing apparatus 10 does not disappear within the predetermined time, the screen 26 displays again the notice information representing the situation that has not disappeared. According to the information transfer method for processing apparatus depicted in FIG. 5, if the situation represented by the notice information of the processing apparatus 10 disappears within the predetermined time, the screen 26 does not display the notice information representing the situation that has not disappeared.

As described above, the information transfer mechanism 1 for processing apparatus according to Embodiment 1 extracts notice information related to the processing apparatus 10 that have entered the visual field 21 of the head-mounted display 20, and edits the extracted notice information so that it will be displayed on the head-mounted display 20 at the positions in the visual field 21 of the extracted processing apparatus 10. Therefore, the information transfer mechanism 1 for processing apparatus according to Embodiment 1 can minimize the problem that the operator 100 cannot tell processing apparatus 10 that are transmitting notice information in a factory where a plurality of processing apparatus 10 are installed. Furthermore, the information transfer mechanism 1 for processing apparatus according to Embodiment 1 can change a display method for display on the head-mounted display 20 depending on the degree of importance of the extracted notice information. The information transfer mechanism 1 for processing apparatus according to Embodiment 1 can thus make it easier for the operator 100 to find notice information of a high degree of importance, giving the operator 100 a sense of urgency.

Embodiment 2

Figure 8:
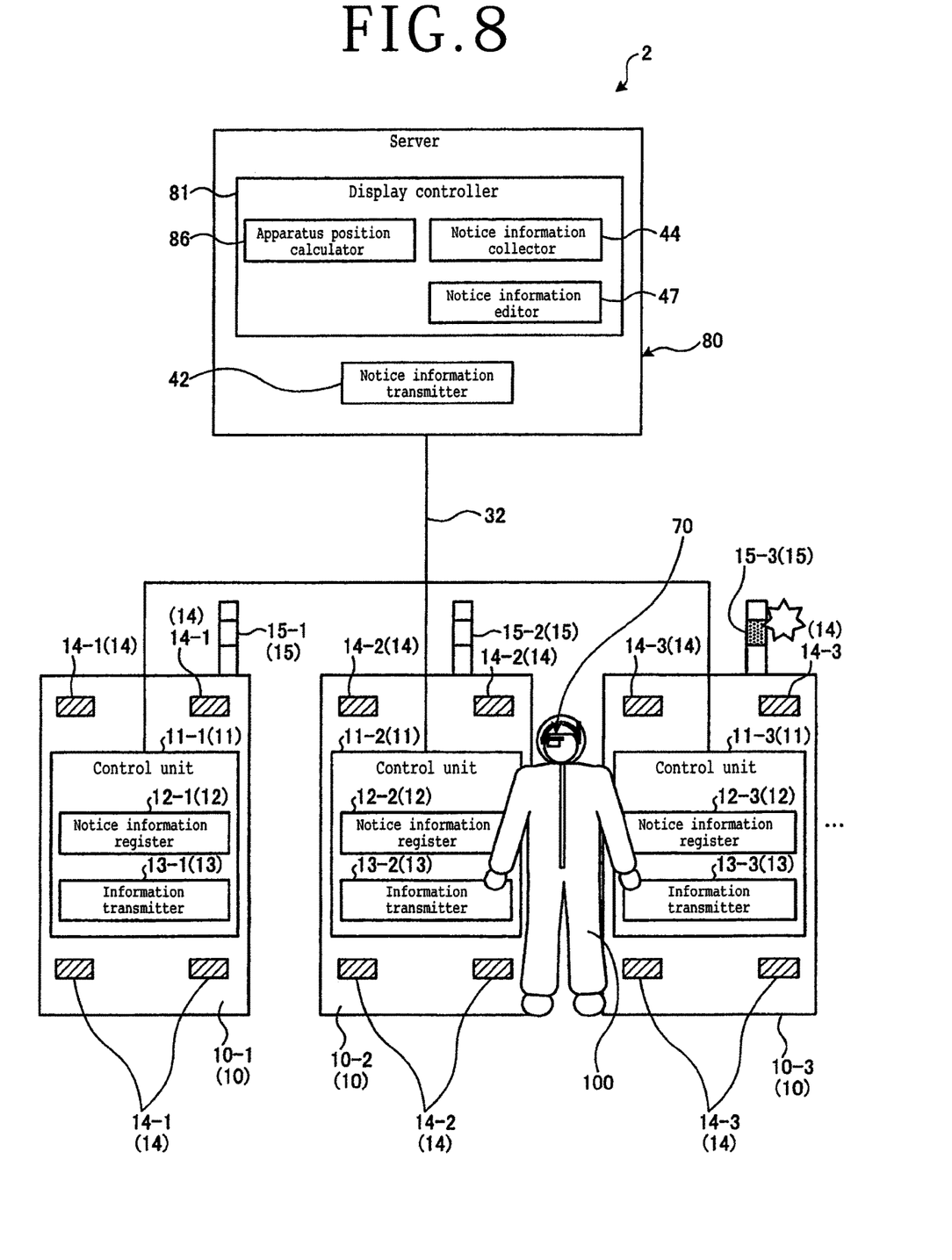
FIG. 8 is a diagram depicting a configurational example of an information transfer mechanism for processing apparatus according to Embodiment 2.
Figure 9:
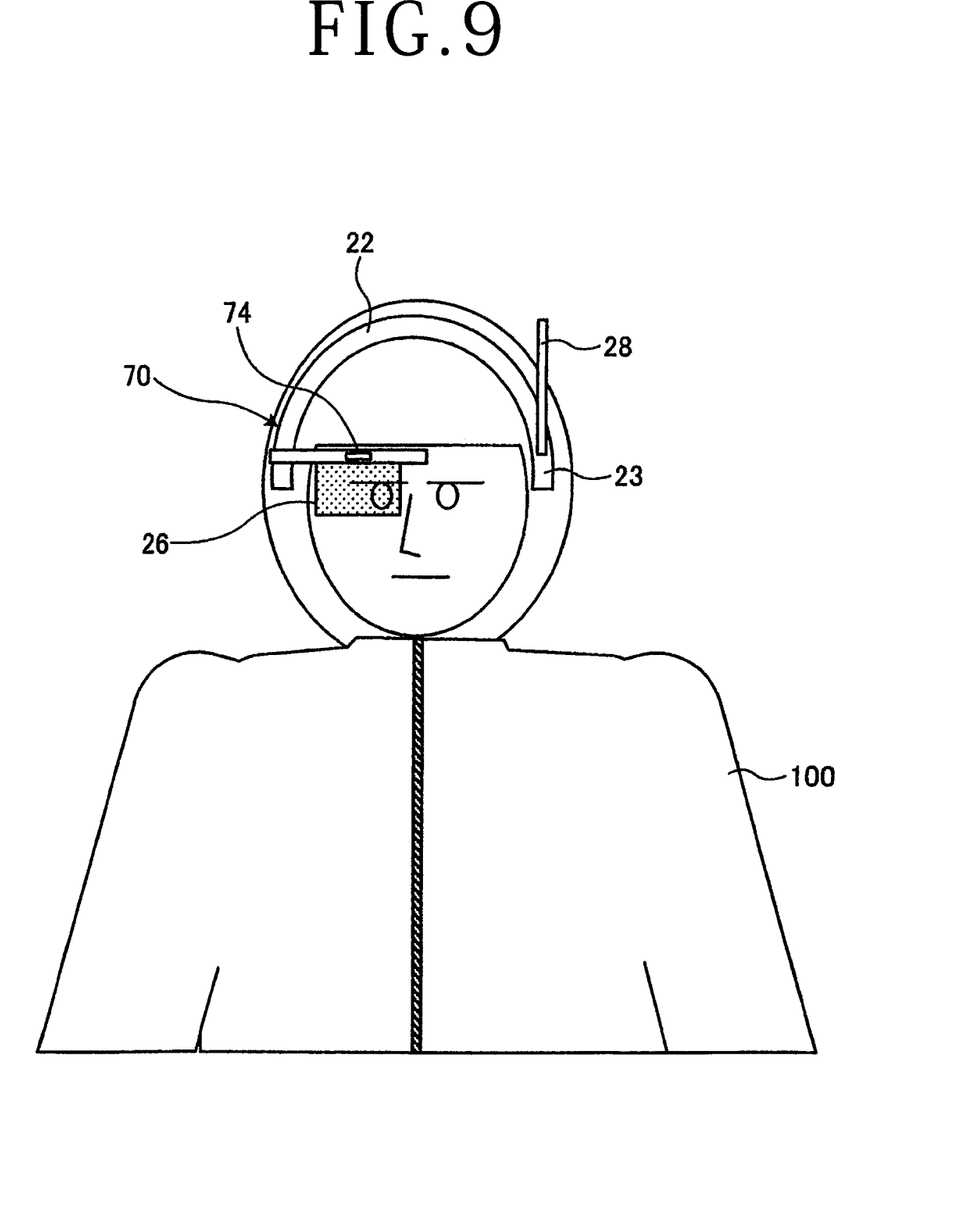
FIG. 9 is a front elevational view depicting a head-mounted display included in the information transfer mechanism for processing apparatus depicted in FIG. 8.

An information transfer mechanism 2 for processing apparatus according to Embodiment 2 of the present invention will be described below with reference to the drawings. FIG. 8 is a diagram depicting a configurational example of the information transfer mechanism 2 for processing apparatus according to Embodiment 2 and FIG. 9 is a front elevational view depicting a head-mounted display included in the information transfer mechanism 2 for processing apparatus depicted in FIG. 8. Those parts depicted in FIGS. 8 and 9 which are identical to those according to Embodiment 1 are denoted by identical reference characters, and not be described in detail below.

The information transfer mechanism 2 for processing apparatus is a mechanism for transferring information of processing apparatus 10 to an operator 100. As depicted in FIG. 8, the information transfer mechanism 2 for processing apparatus has a plurality of processing apparatus 10, a head-mounted display 70, and a server 80. The information transfer mechanism 2 for processing apparatus lacks the head-mounted display detecting mechanism 30.

As depicted in FIG. 8, the processing apparatus 10 of the information transfer mechanism 2 for processing apparatus include respective control units 11, a plurality of identification codes 14, and respective indicators 15. In other words, the processing apparatus 10 of the information transfer mechanism 2 for processing apparatus according to Embodiment 2 are similar to the processing apparatus 10 of the information transfer mechanism 1 for processing apparatus according to Embodiment 1 except that the identification codes 14 are added thereto.

The identification codes 14 include a plurality of identification codes 14 disposed within the range of a predetermined height on the housing of each of the processing apparatus 10 and facing all the sides of the processing apparatus 10 along a passage where the operator 10 can pass. The range of the predetermined height in which the identification codes 14 are disposed refers to the range of a height that can possibly enter the visual field 21. Each of the identification codes 14 is represented by an image in the form of a combination of colors, patterns, and characters, and may be a QR code (registered trademark), for example. The identification codes 14 are able to identify the individual processing apparatus 10.

As depicted in FIG. 9, the head-mounted display 70 includes the mount 22, the power supply switch 23, an image capturing unit 74, the screen 26, and the communication means 28. In other words, the head-mounted display 70 is similar to the head-mounted display 20 according to Embodiment 1 except that the sensor 24 is replaced with the image capturing unit 74. The communication means 28 of the head-mounted display 70 may not have the function of a transmitter for transmitting a medium.

The image capturing unit 74 is fixedly disposed on the screen 26 near an end thereof by the mount 22. The image capturing unit 74 has an image capturing device. The image capturing unit 74 captures, with the image capturing device, an image of the visual field 21 of the head-mounted display 70, including the identification codes 14, thereby acquiring the image of the visual field 21 including the images of the identification codes 14. The image capturing unit 74 is connected to the communication means 28 through a wired link for information communication therebetween. The image capturing unit 74 sends information of the image of the visual field 21 to the server 40 wirelessly via the communication means 28.

As depicted in FIG. 8, the server 80 includes a display controller 81 and the notice information transmitter 42. The display controller 81 has the notice information collector 44, an apparatus position calculator 86, and the notice information editor 47. The server 80 is similar to the server 40 according to Embodiment 1 except that the apparatus position calculator 46 is replaced with the apparatus position calculator 86 and the display controller 81 is devoid of the head-mounted display visual field calculator 45.

The server 80 receives information of the image of the visual field 21 including the images of the identification codes 14 from the communication means 28 of the head-mounted display 70. The apparatus position calculator 86 extracts the processing apparatus 10 that have entered the visual field 21 of the head-mounted display 70 based on the information of the images of the identification codes 14 included in the received image of the visual field 21 of the head-mounted display 70. The apparatus position calculator 86 calculates the positions of the extracted processing apparatus 10 in the visual field 21 based on the received information of the image of the visual field 21 of the head-mounted display 70, the information of the extracted processing apparatus 10, and the positional information of the processing apparatus 10 which has been collected by the notice information collector 44.

Then, an information transfer method for processing apparatus, which represents an example of operation of the information transfer mechanism 2 for processing apparatus according to Embodiment 2, will be described below. The information transfer method for processing apparatus according to Embodiment 2 is similar to the information transfer method for processing apparatus according to Embodiment 1 except that head-mounted display detecting step ST2 and head-mounted display visual field calculating step ST3 are dispensed with, and apparatus position calculating step ST4 is changed. Only apparatus position calculating step ST4 that has been changed from Embodiment 1 will be described below, and those parts that are identical to those according to Embodiment 1 will not be described in detail below.

In apparatus position calculating step ST4, first, the server 80 receives information of the image of the visual field 21 including the images of the identification codes 14 from the communication means 28 of the head-mounted display 70. In apparatus position calculating step ST4, then, the apparatus position calculator 86 extracts the processing apparatus 10 that have entered the visual field 21 of the head-mounted display 70 based on the information of the images of the identification codes 14 included in the received image of the visual field 21 of the head-mounted display 70. In apparatus position calculating step ST4, finally, the apparatus position calculator 86 calculates the positions of the extracted processing apparatus 10 in the visual field 21 based on the received information of the image of the visual field 21 of the head-mounted display 70, the information of the extracted processing apparatus 10, and the positional information of the processing apparatus 10 which has been collected by the notice information collector 44. Apparatus position calculating step ST4 is carried out after notice information collecting step ST1.

As described above, the information transfer mechanism 2 for processing apparatus according to Embodiment 2, as with the information transfer mechanism 1 for processing apparatus according to Embodiment 1, extracts notice information related to the processing apparatus 10 that have entered the visual field 21 of the head-mounted display 70, and edits the extracted notice information so that it will be displayed on the head-mounted display 70 at the positions in the visual field 21 of the extracted processing apparatus 10. Therefore, the information transfer mechanism 2 for processing apparatus according to Embodiment 2, as with the information transfer mechanism 1 for processing apparatus according to Embodiment 1, can minimize the problem that the operator 100 cannot tell processing apparatus 10 that are transmitting notice information in a factory where a plurality of processing apparatus 10 are installed. Furthermore, the information transfer mechanism 2 for processing apparatus according to Embodiment 2, as with the information transfer mechanism 1 for processing apparatus according to Embodiment 1, can change a display method for display on the head-mounted display 70 depending on the degree of importance of the extracted notice information. The information transfer mechanism 2 for processing apparatus according to Embodiment 2, as with the information transfer mechanism 1 for processing apparatus according to Embodiment 1, can thus make it easier for the operator 100 to find notice information of a high degree of importance, giving the operator 100 a sense of urgency.

The present invention is not limited to the details of the above described preferred embodiments. The scope of the invention is defined by the appended claim and all changes and modifications as fall within the equivalence of the scope of the claim are therefore to be embraced by the invention.

What is claimed is:

1. An information transfer mechanism for transferring information of at least one processing apparatus to an operator, comprising:
   a plurality of processing apparatuses, provided in a compartment, each having an information transmitter for transmitting positional information of the processing apparatus, individual identification information of the processing apparatus, and notice information to be notified to the operator;
   at least one movable head-mounted display, provided in the compartment, receiving the notice information of at least one processing apparatus which has entered a visual field thereof and displaying the received notice information in overlapping relation to a scene of a peripheral processing apparatus;
   at least one stationary head-mounted display detecting unit located in the compartment separately from and in communication with the head-mounted display for acquiring a specific location of the at least one head-mounted display from a direction and a distance of the head-mounted display within the compartment from a signal transmitted by the head-mounted display; and
   a server, located separately from and in communication with the at least one head-mounted display detecting unit and the at least one head-mounted display, for receiving the specific location of the at least one head-mounted display within the compartment from the head-mounted display detecting unit, and determining the location of the at least one head-mounted display relative to the plurality of processing apparatuses based on the specific location of the least one head-mounted display in the compartment, and for transmitting, to the head-mounted display, the notice information of the at least one processing apparatus which has entered a visual field of the at least one head-mounted display;
   wherein the server calculates the visual field based on the position of the head-mounted display and a line-of-sight of the head-mounted display.

2. The information transfer mechanism as defined in claim 1 further comprising
   a sensor provided on the head-mounted display for acquiring the line-of-sight information of the head-mounted display.

* * * * *